May 17, 1927.

A. PATUS ET AL 1,629,407

WHEEL BRAKE

Filed Nov. 26, 1924 2 Sheets-Sheet 1

Inventors
A. Patus
L. Nagy

By Bryant + Lowry
Attorneys

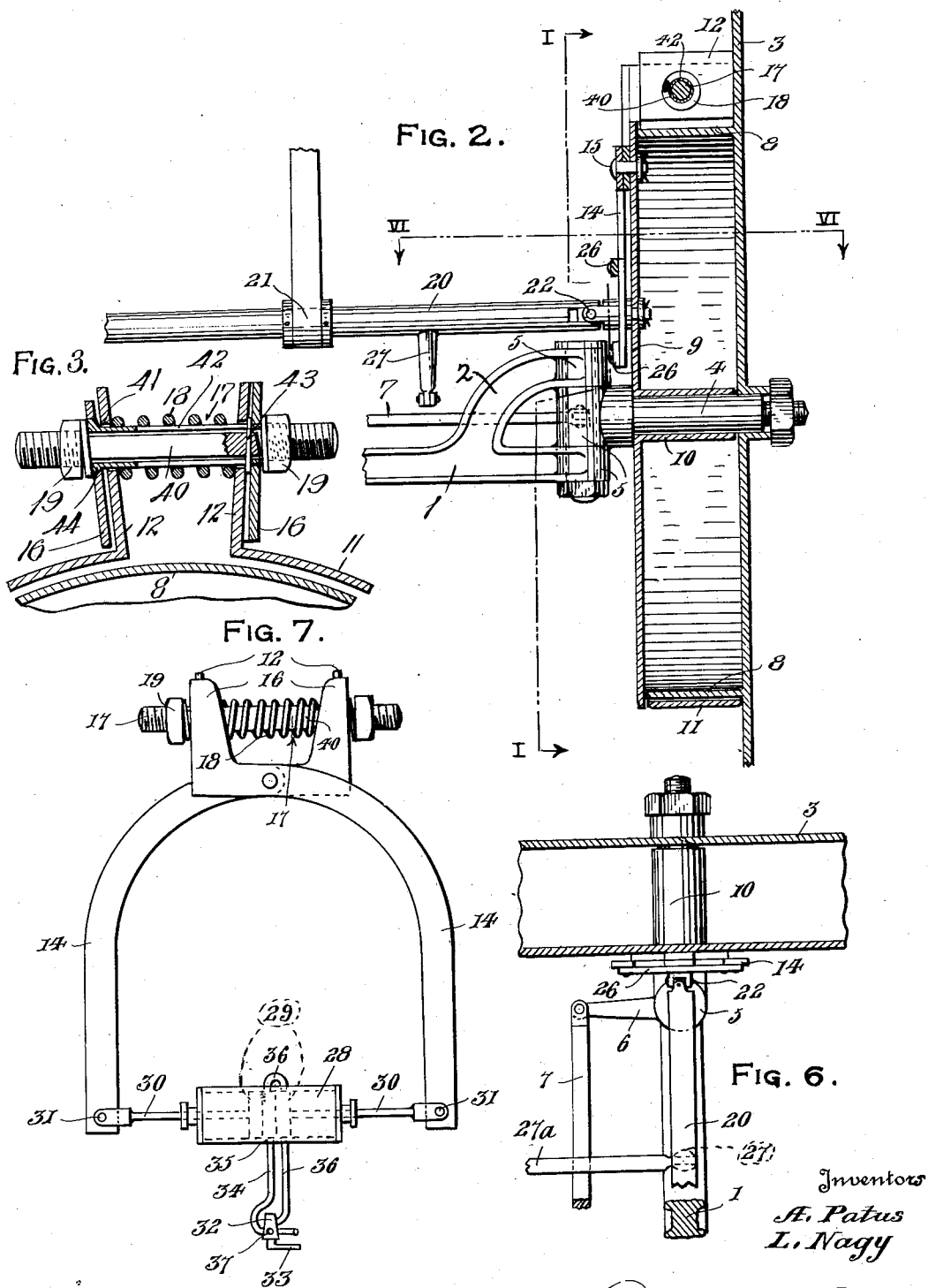

Patented May 17, 1927.

1,629,407

UNITED STATES PATENT OFFICE.

ALEXANDER PATUS AND LOUIS NAGY, OF SOUTH BEND, INDIANA, ASSIGNORS OF ONE-THIRD TO N. E. MAY, OF SOUTH BEND, INDIANA.

WHEEL BRAKE.

Application filed November 26, 1924. Serial No. 752,326.

This invention relates to certain new and useful improvements in wheel brakes and more particularly to a brake associated with the front steering wheel of an automobile.

The primary object of the invention is to provide a brake for the front steering wheel of an automobile wherein a circular brake band carries end extensions associated with a pair of tensioned levers that are manually controlled in their operation to effect the application of the brake band to a brake drum carried by a wheel.

A further object of the invention is to provide in a wheel brake of the type above set forth, either mechanical or pneumatic means for operating the levers to apply the brake band to the drum.

With the above and other objects in view that will appear as the nature of the invention is better understood, the same consists of the novel form, combination and arrangement of parts hereinafter more fully described, shown in the accompanying drawings and claimed.

Figure 1:
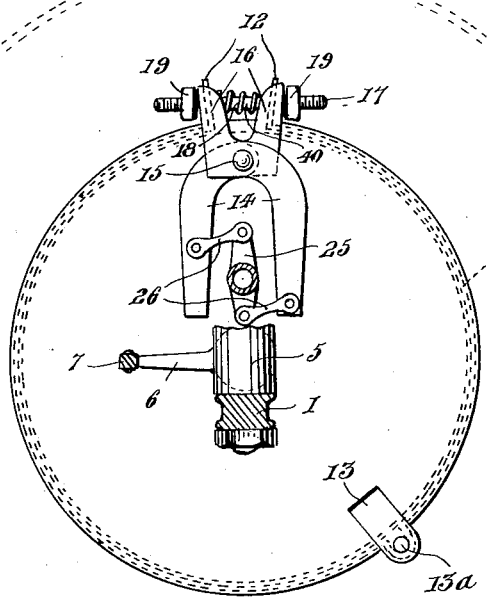
Figure 4:
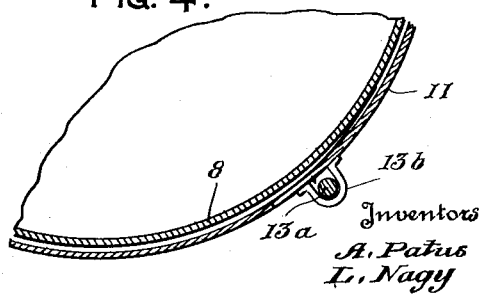
Figure 5:
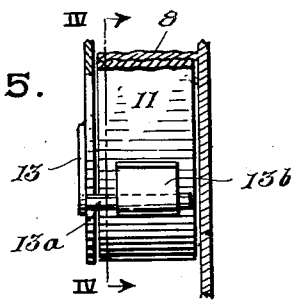

In the drawing, wherein like reference characters designate corresponding parts throughout the several views, Figure 1 is a vertical sectional view taken on line I—I of Fig. 2 showing a side elevational view of a wheel equipped with the improved brake mechanism that is partly shown in section, Figure 2 is a fragmentary side elevational view, partly in section showing the steering wheel and brake mechanism associated therewith, Figure 3 is a detail sectional view showing the end extensions of the circular brake bands associated with the tensioned ends of a pair of operating levers, Figure 4 is a detail sectional view taken on line IV—IV of Fig. 5, Figure 5 is a fragmentary elevational view, partly in section showing a guide pin for retaining one side of the brake band in position upon the brake drum, Figure 6 is a detail sectional view taken on line VI—VI of Fig. 2 showing the mechanical brake applying devices in top plan, and Figure 7 is an enlarged side elevational view illustrating a pneumatic device associated with the levers that operate the brake bands.

Referring more in detail to the accompanying drawings, there is illustrated a brake for the front steering wheel of an automobile wherein the front axle bar 1 that is forked as at 2 for supporting at the outer end thereof a wheel 3 thru the medium of a stub axle 4 and a vertical steering knuckle connection 5 as shown more clearly in Fig. 2. The middle section of the steering knuckle connection 5 carries an outwardly directed arm 6 that is attached at its outer end to the steering rod 7 for swinging the stub axle 4 and wheel 3 upon the knuckle connection as will at once be understood from an inspection of Figs. 1 and 2.

A brake drum 8 surrounds the stub axle 4 and is secured to the inner face of the wheel 3 while a disk plate 9 carrying a tubular sleeve 10 thru which the stub axle 4 is journaled has its peripheral edge disposed adjacent the inner annular edge of the brake drum 8. A circular brake band 11 encloses the drum 8 between the wheel 3 and the disk plate 9 and carries a pair of adjacent outwardly directed extension arms 12 as clearly shown in Fig. 3. To insure the correct positioning of the brake band upon the drum, an arm 13 carried by the disk plate 9 adjacent the peripheral edge thereof carries a pin 13$^a$ that extends into a keeper loop 13$^b$ on the brake band 11 as shown in Figs. 4 and 5.

The operating means for the brake band includes a pair of levers 14 that are pivoted together at 15 with their upper end extensions 16 having alined openings therein to receive the bolt 17 while the end extensions 12 of the brake band 11 are similarly mounted on the two-part bolt 17 inwardly of the upper ends 16 of the levers. A coil spring 18 surrounds the bolt 17 between the brake band extensions 12 and adjusting nuts 19 threaded on the outer ends of the bolt members vary the tension on the spring and normally hold the brake band ends in a separated position with the brake band spaced from the brake drum.

As shown more clearly in Fig. 2, an operating shaft 20 is journaled at one end in the bearing 21 carried by the vehicle body and has a universal connection 22 with a stub shaft 23 that is rotatably mounted as at 24 in the disk plate 9. A lever arm 25 is fixed to the shaft 23 and projects from opposite sides of the shaft as shown in Fig. 1 and has link connections 26 with the lever arms 14, one of the links being disposed at the lower end of one of the lever arms 14 while the other link is connected to the opposite lever arm substantially midway the ends thereof. An arm 27 projecting outwardly from the shaft 20 is connected to the brake pedal of the automobile by the rod 27ª and when the shafts 20 and 23 are rotated by the brake pedal, the lever arm 25 shifts the lever arms 14 thru the link connections 26 for moving the lower ends 16 of the lever arms toward each other together with the end extensions 12 of the brake band against the tension of the spring 18 for applying the brake band to the brake drum 8. In view of the universal connection 22 between the shafts 20 and 23 the stub axle 4 supporting the wheel 3 is free to rotate upon the steering knuckle connection 5 while the shaft 23 is capable of being rotated regardless of its position relative to the shaft 20 so that the brake band 11 may be applied during different angular or turning positions of the wheel 3.

The lever arms 14 are also capable of being operated by pneumatic devices as illustrated in Fig. 7 wherein a cylinder 28 disposed between the upper ends of the lever arms 14 encloses a pair of piston heads 29, the piston rods 30 of which project thru the outer ends of the cylinder 28 for connection with the upper ends of the lever arms 14 as at 31. A valve 32 having a controlling lever 33 and in communication with a source of air supply has a pipe extension 34 that enters the cylinder 28 as at 35 between the two piston heads 29 while the exhaust air pipe 36 at the opposite side of the cylinder returns to the valve 32 and exhausts to the atmosphere as at 37. When the valve 32 is open to permit the flow of air to the cylinder 28, the pistons 29 are moved outwardly therein for operating the lever arms 14 and when the movement the brake band 11 and when the movement of the valve 32 is reversed, the supply of air is shut off and the spring 18 moving the lever arms 14 and shifting the piston heads 29 toward the center of the cylinder, air is exhausted thru the pipe 36 and valve 32 to the exhaust 37.

The two-part bolt 17 is shown in detail in Fig. 3 and is preferably constructed to embody two sections, an inner rod section 40 telescoping within the sleeve or tubular section 41. Diametrically opposite longitudinal slots 42 are provided in the tubular section 41 and a pin 43 extending across the end of the rod section 40 has its opposite projecting ends engaging the outer side of the adjacent band extension 12 as illustrated.

The open end of the tubular section 41 carries an outwardly directed annular flange 44 slidable through an opening in the lever extension 16 and engaging the outer face of the adjacent band extension 12. The coil spring 18 surrounds the bolt sections with the opposite end thereof engaging the inner sides of the band extensions. The outer end of the tubular section 41 is of solid construction and threaded for the reception of the nut 19 while the end of the rod 40 that is located outwardly of the annular flange 44 is enlarged and threaded for receiving the other nut 19. With a construction of this character, a greater variance of the tension on the spring may be attained.

From the above detail description of the invention, it is believed that the construction and operation thereof will at once be understood, and while there are herein shown and described the preferred embodiments of the present invention, it is nevertheless to be understood that minor changes may be made therein without departing from the spirit and scope of the invention as claimed.

What is claimed as new is:—

In a brake for the steering wheels of automobiles, a wheel, a brake drum carried thereby, a stub axle supporting the wheel, a disk plate associated with the drum and through which the stub axle extends, a split brake band enclosing the drum and having apertured end extensions, a bolt passing through the apertures of the end extensions, said bolt including an inner rod section having one end threaded and the remaining end provided with a transverse pin, an outer tubular section having a flanged end associated with the threaded end of the rod section and its remaining end externally threaded and associated with the remaining end of the rod section, the tubular section having diametrically opposed longitudinally extending slots within which the ends of said transverse pin are slidably arranged, and a nut on each threaded end; a pair of pivoted crossed levers each having at one end a lateral extension which is apertured for the reception of said bolt and also being associated with the band ends, and manually controlled devices associated with the free ends of the cross levers to cause the lateral extensions of the same to shift the band extensions toward each other and move the band into engagement with the drum.

In testimony whereof we affix our signatures.

ALEXANDER PATUS.
LOUIS NAGY.